United States Patent
Greaves, Jr. et al.

(10) Patent No.: US 7,837,216 B1
(45) Date of Patent: Nov. 23, 2010

(54) TOW BAR APPARATUS

(75) Inventors: John C. Greaves, Jr., Naples, FL (US); Jason J. Kraai, Hull, IA (US)

(73) Assignee: Dethmers Manufacturing Company, Boyden, IA (US)

( * ) Notice: Subject to any disclaimer, the term of this patent is extended or adjusted under 35 U.S.C. 154(b) by 0 days.

(21) Appl. No.: 12/418,719

(22) Filed: Apr. 6, 2009

Related U.S. Application Data

(60) Provisional application No. 61/144,153, filed on Jan. 12, 2009.

(51) Int. Cl.
- B60D 1/54 (2006.01)
- B60D 1/14 (2006.01)
- B60D 1/167 (2006.01)

(52) U.S. Cl. .............. 280/491.4; 280/491.3; 280/491.5; 280/494

(58) Field of Classification Search ................. 280/494, 280/405.1, 406.2, 406.1, 455.1, 491.3, 491.4, 280/491.5; 292/290, 292, 297; 403/325, 403/328
See application file for complete search history.

(56) References Cited

U.S. PATENT DOCUMENTS

| | | | |
|---|---|---|---|
| 1,185,435 A | 5/1916 | Powell | |
| 1,435,063 A * | 11/1922 | Holmes | 280/482 |
| 2,071,883 A | 2/1937 | La Hodny | |
| 2,139,970 A | 12/1938 | Moore | |
| 2,486,483 A | 11/1949 | Landen | |
| 2,854,251 A * | 9/1958 | Able et al. | 280/416.1 |
| RE24,719 E * | 10/1959 | Cline et al. | 414/563 |
| 2,916,301 A | 12/1959 | Cushman | |
| 3,000,652 A | 9/1961 | Hawkins | |
| 3,492,022 A * | 1/1970 | Hansen | 280/478.1 |
| 3,572,765 A * | 3/1971 | Tieben | 280/491.4 |
| 3,583,728 A * | 6/1971 | Cornell et al. | 280/503 |
| 4,013,303 A * | 3/1977 | Milner | 280/491.4 |
| 5,112,074 A * | 5/1992 | Smith | 280/483 |
| 5,441,294 A * | 8/1995 | Losier | 280/491.4 |
| 5,516,140 A | 5/1996 | Hinte | |
| RE35,482 E | 3/1997 | Johnson | |
| 5,765,851 A | 6/1998 | Parent | |
| 5,873,595 A | 2/1999 | Hinte | |
| 5,909,887 A | 6/1999 | Hobrath | |
| 5,915,715 A * | 6/1999 | Ford | 280/494 |
| 5,957,477 A * | 9/1999 | Ensz et al. | 280/482 |
| 6,168,182 B1 | 1/2001 | Ford | |
| 6,502,847 B1 | 1/2003 | Greaves | |
| 6,612,604 B2 | 9/2003 | Greaves | |

(Continued)

*Primary Examiner*—Anne Marie M Boehler
*Assistant Examiner*—Daniel Yeagley
(74) *Attorney, Agent, or Firm*—Eric Karich

(57) ABSTRACT

A tow bar apparatus has a hitch member, a pair of linkages, and a pair of tow bars. The hitch member has a receiver tube adapted to removably engage a towing vehicle, and a vertical pivot post having a vertical axis that is generally orthogonal to the surface when the hitch member is mounted on the towing vehicle. Each of the pair of linkages connects the hitch member to a proximal end of one of the pair of tow bars. Each linkage includes a vertical aperture that pivotally mounts the linkage on the vertical pivot post, and a horizontal pivot pin attached to one of the pair of tow bars. A towed vehicle attachment element of a distal end of each of the tow bars is adapted to be removably attached to the towed vehicle.

2 Claims, 5 Drawing Sheets

U.S. PATENT DOCUMENTS 6,619,686 B1 * 9/2003 Klar .................. 280/491.3
6,755,589 B2 * 6/2004 Friesen ................ 403/141
6,764,092 B1   7/2004 Greaves
7,004,490 B2 * 2/2006 Klar .................. 280/491.3
7,032,919 B1 * 4/2006 Hahne et al. ............ 280/493
7,125,031 B1 * 10/2006 Schoonover ............ 280/293
7,445,226 B1 * 11/2008 Hahne et al. ............ 280/493

* cited by examiner

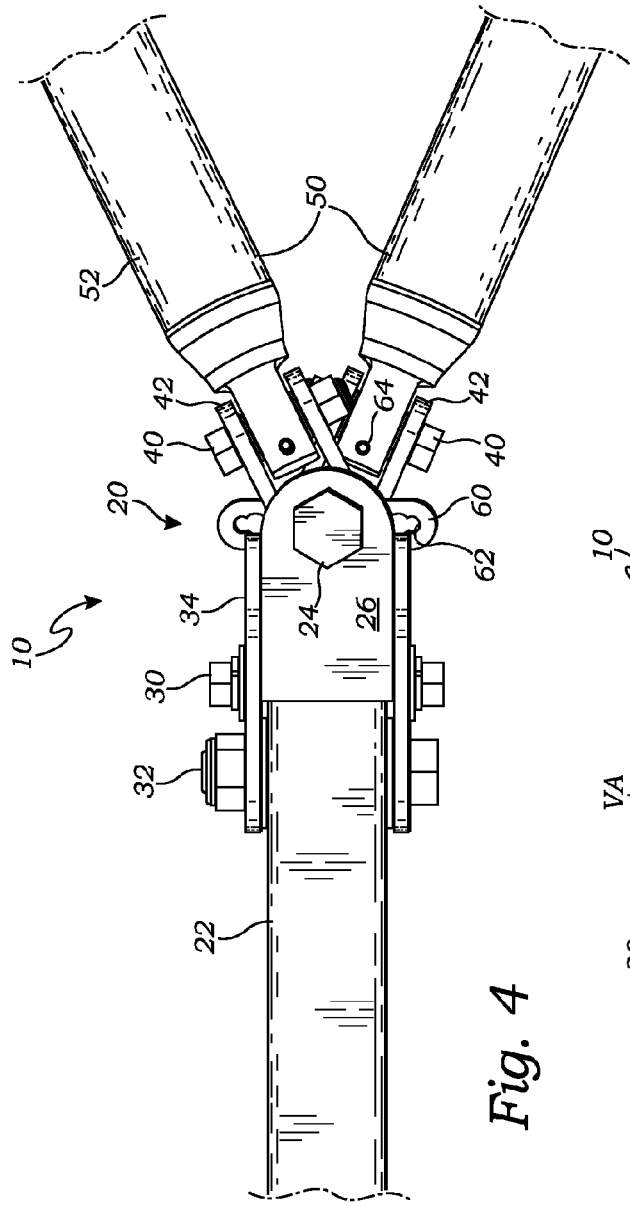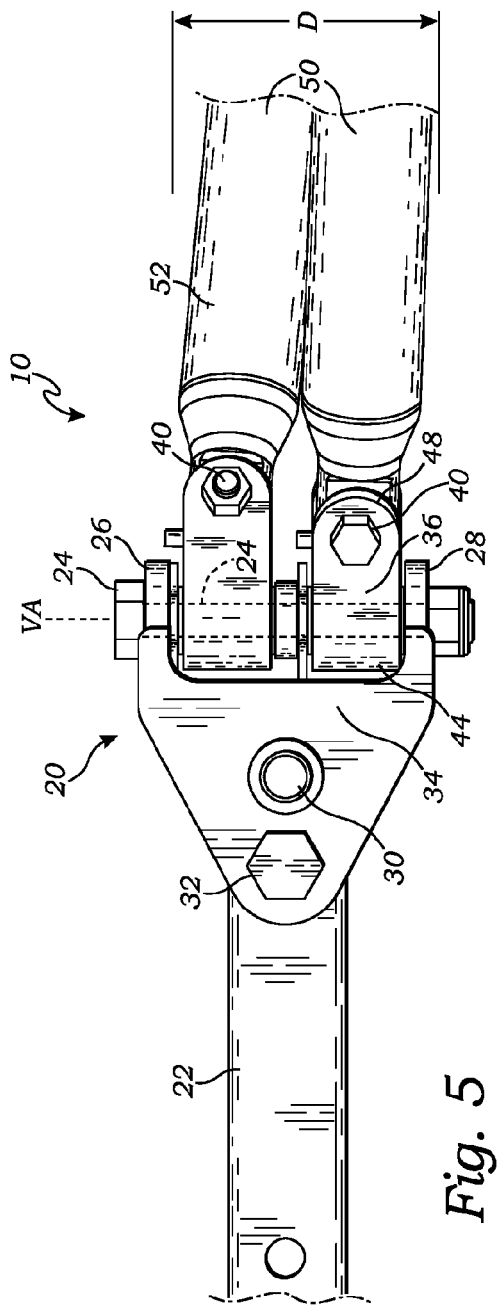

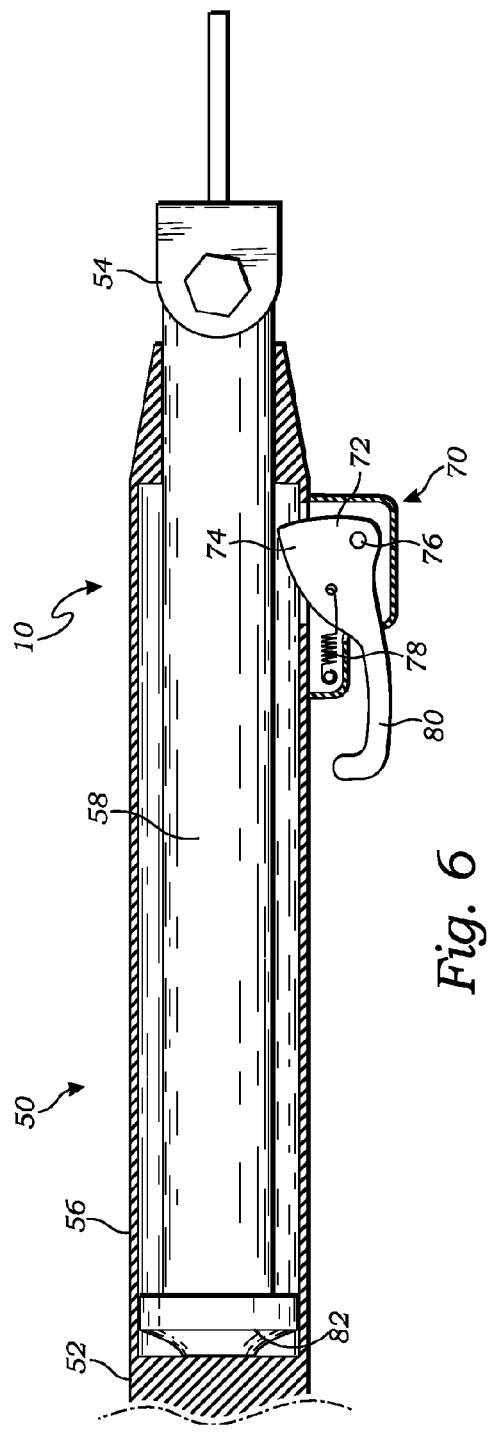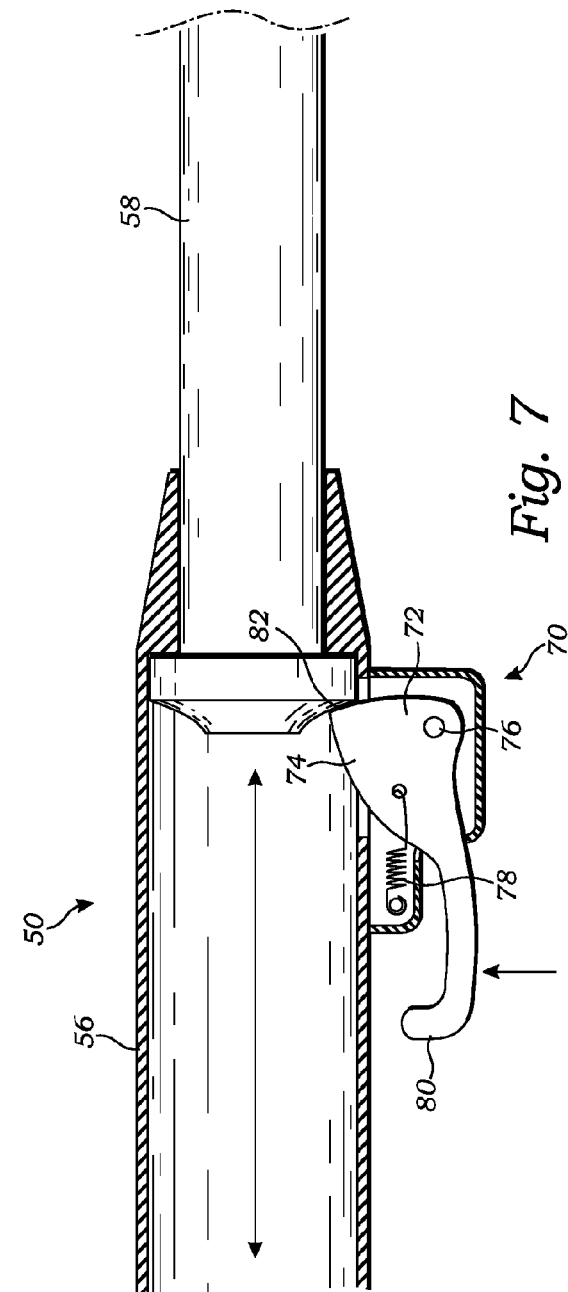

TOW BAR APPARATUS

CROSS-REFERENCE TO RELATED APPLICATIONS

This application for a utility patent claims the benefit of U.S. Provisional Application No. 61/144,153, filed Jan. 12, 2009.

STATEMENT REGARDING FEDERALLY SPONSORED RESEARCH

Not Applicable

BACKGROUND OF THE INVENTION

1. Field of the Invention

This invention relates generally to tow bars, and more particularly to a tow bar apparatus that includes a pair of tow bars attached to a towing vehicle via a stacked pair of linkages pivotally mounted on a vertical pivot post.

2. Description of Related Art

The state of the art in delta-type tow bar assemblies is disclosed in Greaves, U.S. Pat. Nos. 6,764,092, 6,612,604, and 6,502,847, which teach delta-type tow bar apparatus that includes ball-and-socket connections at both the towing vehicle and the towed vehicle.

Tow bars that bolt directly onto a towing vehicle for towing a towed vehicle are also well known in the prior art. Examples of such tow bars are shown in Parent, U.S. Pat. No. 5,765,851, and Johnson, U.S. RE 35,482.

It is also known to substitute at least one of the hinged connections with a ball-and-socket connection. Examples of this are shown in R. E. Moore, U.S. Pat. No. 2,139,970 and J. E. Powell, U.S. Pat. No. 1,185,435. Other prior art references of interest include W. W. Cushman, U.S. Pat. No. 2,916,301, W. La Hodny, U.S. Pat. No. 2,071,883, and Hobrath, U.S. Pat. No. 5,909,887.

The prior art teaches various forms of tow bars that are adapted to be mounted between the towed and towing vehicle. However, the prior art does not teach a tow bar apparatus that includes a pair of tow bars attached to a towing vehicle via a pair of linkages pivotally mounted in a stacked relationship on a vertical pivot post. The present invention fulfills these needs and provides further related advantages as described in the following summary.

SUMMARY OF THE INVENTION

The present invention teaches certain benefits in construction and use which give rise to the objectives described below.

The present invention provides a tow bar apparatus for use by a towing vehicle for towing a towed vehicle. The tow bar apparatus includes a hitch member having a receiver tube and a vertical pivot post. The receiver tube is adapted to removably engage the hitch receiver of the towing vehicle. The vertical pivot post has a vertical axis that is generally orthogonal to the surface when the hitch member is mounted on the towing vehicle. A pair of linkages connect the hitch member to a pair of tow bars. Each linkage includes a vertical aperture and a horizontal pivot pin. The vertical aperture pivotally mounts the linkage on the vertical pivot post. The horizontal pivot pin is attached to one of the pair of tow bars. A towed vehicle attachment element is adapted to be removably attached to the towed vehicle.

A primary objective of the present invention is to provide a tow bar apparatus having advantages not taught by the prior art.

Another objective is to provide a tow bar apparatus that includes a pair of tow bars attached to a towing vehicle via a pair of linkages pivotally mounted on a vertical pivot post in a stacked relationship.

A further objective is to provide a tow bar apparatus that includes tow bars that each include first and second tow bar elements that may rotate with respect to each other, such that the tow bar apparatus can twist with the rotational movement of the vehicles without failing.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 4 is a top plan view thereof;

FIG. 5 is a side elevational view thereof;

FIG. 6 is a sectional view of one of the pair of tow bars in a stored configuration; and FIG. 7 is a sectional view thereof in an elongate, towing position.

DETAILED DESCRIPTION OF THE INVENTION

The above-described drawing figures illustrate the invention, a tow bar apparatus 10 for use by a towing vehicle 12 to tow a towed vehicle 16 over a surface S, such as a road.

Figure 1:
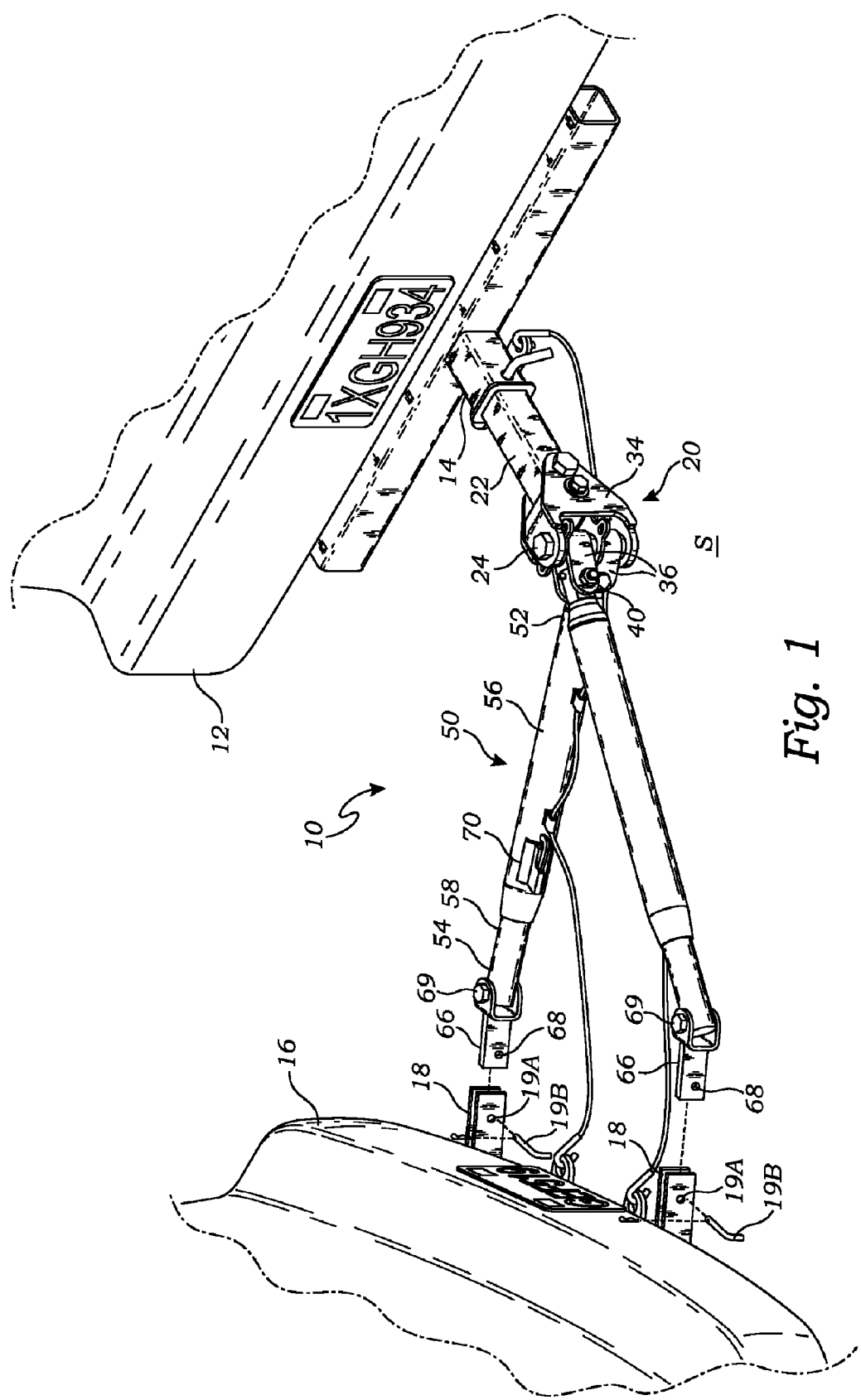
FIG. 1 is a perspective view of a tow bar apparatus in one embodiment of the present invention, illustrating the tow bar apparatus being installed between a towing vehicle and a towed vehicle.
Figure 2:
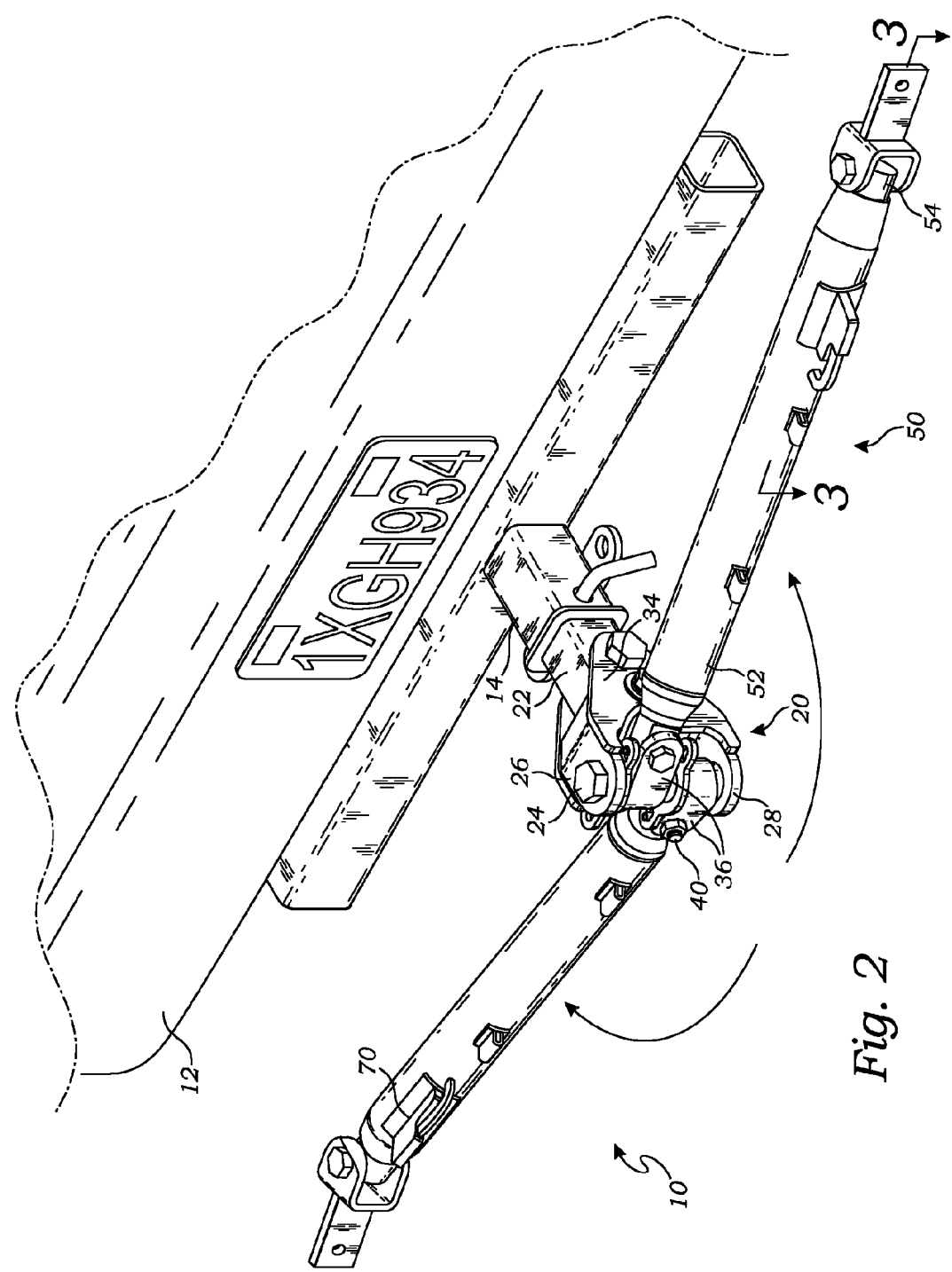
FIG. 2 is a perspective view of the tow bar apparatus in a stored position on the towing vehicle.

FIG. 1 is a perspective view of the tow bar apparatus 10 in one embodiment of the present invention, illustrating the tow bar apparatus 10 in a towing position between the towing vehicle 12 and the towed vehicle 16. FIG. 2 is a perspective view of the tow bar apparatus 10 in the stored position on the towing vehicle 12, when not towing the towed vehicle 16.

As illustrated in FIG. 1, both the towing vehicle 12 and the towed vehicle 16 include structures that are adapted to physically engage the tow bar apparatus 10. The towing vehicle 12 has a hitch receiver 14 that is used for towing vehicles, trailers, and the like. For purposes of this application, the term "hitch receiver" is hereby defined to include any form of towing hitch known in the art that may be adapted for use as described herein. Since receivers and other forms of towing hitches are well known in the art, it is not described in greater detail herein.

Likewise, the towed vehicle 16 has a pair of attachment points 18 that are adapted to securely engage the tow bar apparatus 10 with the towed vehicle 16. In one embodiment, the pair of attachment points 18 may each include a pair of tabs constructed of steel or similarly strong and durable material. The tabs 18 each include apertures 19A adapted to receive a locking pin 19B, as is described in greater detail below. However, while these tabs 18 are one embodiment of the attachment points 18, the attachment points 18 may be provided by any form of physical structure that is readily adapted for attaching the tow bar apparatus 10, and such alternatives should be considered within the scope of the present invention.

As shown in FIG. 1, the tow bar apparatus 10 includes a hitch member 20 that is adapted to be removably engaged with the hitch receiver 14 of the towing vehicle 12. The tow bar apparatus 10 also includes a towed vehicle attachment element 66 that is adapted to be removably engaged with the attachment points 18 of the towed vehicle 16. The hitch member 20 and the towed vehicle attachment element 66 are discussed in greater detail below.

Figure 3:
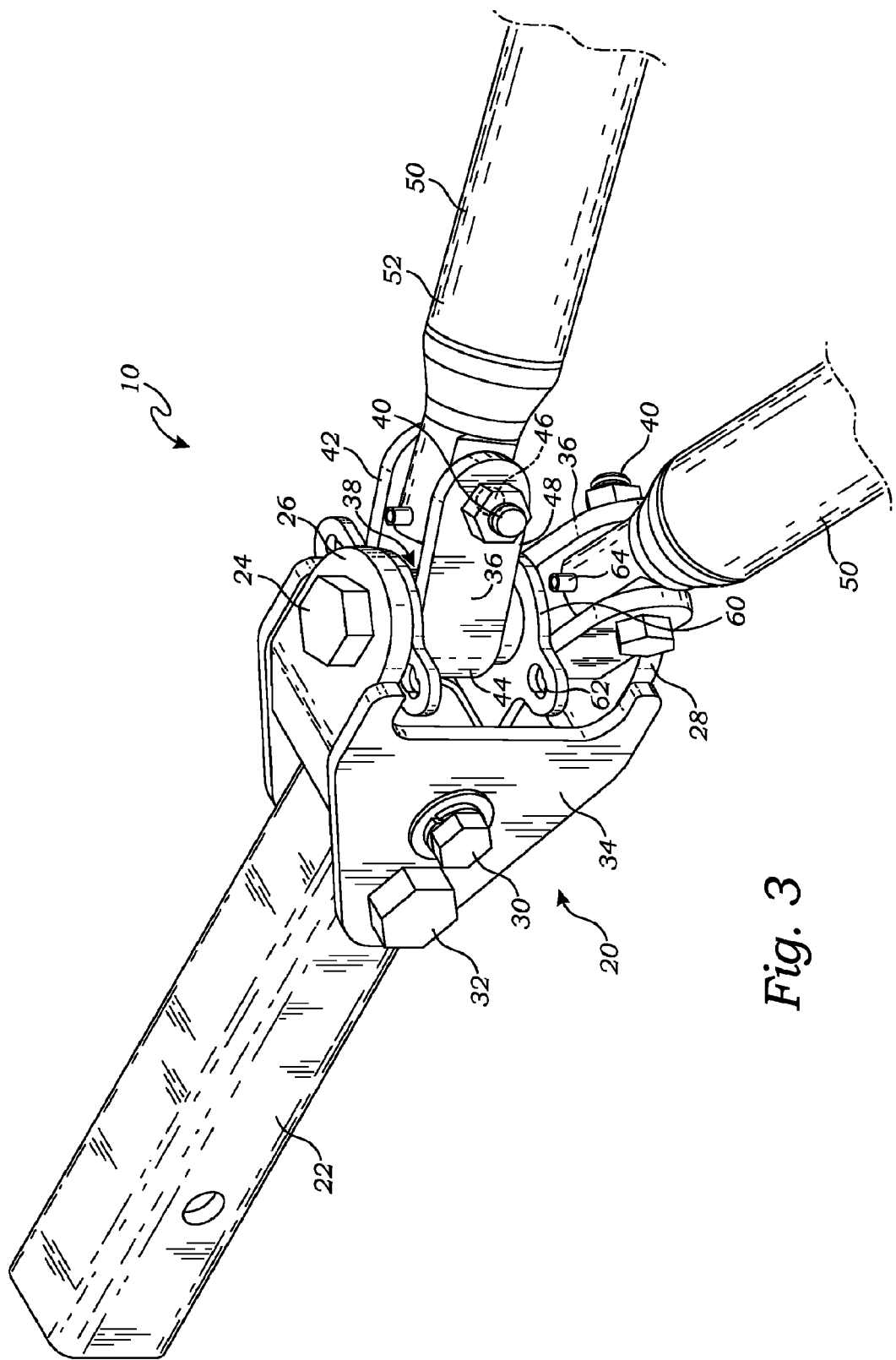
FIG. 3 is a perspective view of a hitch member of the tow bar apparatus.

FIG. 3 is a perspective view of the hitch member 20 of the tow bar apparatus 10. FIG. 4 is a top plan view of the hitch member 20, and FIG. 5 is a side elevational view thereof. As illustrated in FIGS. 1-5, the hitch member 20 has a receiver tube 22 and a vertical pivot post 24. The receiver tube 22 is adapted to removably engage the hitch receiver 14 of the towing vehicle 12. In the present embodiment, the receiver tube 22 is a steel tubular construction having a square cross section, although other shapes and materials are also possible. For purposes of this application, the term "receiver tube" is defined to include alternative constructions that are adapted to removably engage the hitch receiver 14, described above. The specific physical construction is not critical, as long as the two elements function to removably mount the hitch member 20 on the towing vehicle 12.

The vertical pivot post 24 has a vertical axis VA that is generally orthogonal to the surface S when the hitch member 20 is mounted on the towing vehicle 12. The pivot post may be any form of bolt, rod, or similar structure upon which a pair of linkages 36 may be mounted in a stacked arrangement such that they may pivot on a horizontal plane, as described in greater detail below.

In one embodiment, the vertical pivot post 24 is formed by a bolt that passes through a top plate 26 and a bottom plate 28. The top and bottom plates 26 and 28 are spaced by a distance D great enough to receive the pair of linkages 36 therebetween. The top and bottom plates 26 and 28 may be connected by side panels 34, and fastened to the receiver tube 22 with a pivot bolt 32 and a locking bolt 30 through the side panels 34 and the receiver tube 22. The locking bolt 30 may be engaged in different aperture (not shown) or at different locations of a slot (not shown) to adjust the angle of the vertical pivot post 24, as is known in the art, to adjust for the different relative heights of the towing vehicle 12 and the towed vehicle 16. Since this adjustment is well known in the prior art, and is described in Greaves, U.S. Pat. No. 6,764,092, which is hereby incorporated by reference in full, it is not described in greater detail herein.

As illustrated in FIGS. 1-5, the pair of linkages 36 each include a vertical aperture 38 and a horizontal pivot pin 40. The vertical aperture 38 is adapted for pivotally mounting the linkages 36 on the vertical pivot post 24 of the hitch member 20 such that the linkages 36 are mounted in a stacked arrangement and such that the linkages 36 may pivot horizontally about the vertical axis VA of the vertical pivot post 24, on the horizontal plane (which is generally parallel to the surface S).

Each of the pair of linkages 36 may include a U-shaped body 42 having the vertical aperture 38 formed in a base 44 of the U-shaped body 42. The horizontal pivot pin 40 may be positioned through apertures through a top of the U-shaped body 42. While this construction is used in the present embodiment, those skilled in the art may devise alternative constructions that function in a similar or equivalent manner, and such alternatives should be considered within the scope of the present embodiment.

The tow bar apparatus 10 further includes a pair of tow bars 50 that are each adapted to be mounted on one of the linkages 36. Each of the tow bars 50 has a proximal end 52, and a distal end 54 opposite the proximal end 52. In one embodiment, each of the pair of tow bars 50 may be formed by a first tow bar element 56 telescopically engaged with a second tow bar element 58 such that the first and second tow bar elements 58 slide into and out of each other. The first and second tow bar elements 56 and 58 may slide between a collapsed configuration, wherein they are a shorter length that is suitable for storage, and an elongate towing configuration wherein they are extended to full length and most suitable for towing.

The proximal end 52 of each of the first tow bar elements 56 is adapted to be pivotally attached to one of the linkages 36 with the horizontal pivot pin 40. The horizontal pivot pin 40 enables the tow bar 50 to pivot vertically with respect to the linkage 36. Together, the vertical pivot post 24 and the horizontal pivot pin 40 enable the tow bar 50 a wide range of motion with respect to the hitch member 20.

In one embodiment, the tow bars 50 are identical to each other, thereby reducing manufacturing costs and inventory.

As illustrated in FIGS. 2 and 3, in one embodiment, a storage plate 60 may be positioned on the vertical pivot post 24 adjacent the proximal ends 52 of the tow bars 50 for locking the tow bars 50 in the stored position. The storage plate 60 has a stored locking aperture 62 positioned adjacent the proximal end 52 of the tow bars 50. A locking post 64 (best shown in FIG. 3) of the proximal end 52 may engage the stored locking aperture 62 of the storage plate 60 when the tow bar 50 is in a stored position, thereby locking the tow bar 50 in the stored position, as illustrated in FIG. 2. While FIG. 2 shows the tow bars 50 on opposite sides of the vertical pivot post 24, they could also both be locked on the same side, depending upon the needs of the user.

The distal end 54 of each of the tow bars 50, opposite the proximal end 52, includes a towed vehicle attachment element 66 pivotally attached to the tow bar 50. The towed vehicle attachment element 66 is pivotally attached to the tow bar 50 with a vertical pivot pin 69.

The vertical pivot pin 69 enables the towed vehicle attachment element 66 to pivot on a horizontal plane with respect to the tow bar 50.

As illustrated in FIG. 1, the towed vehicle attachment element 66 is adapted to be removably attached to the pair of attachment points 18 of the towed vehicle 16. In one embodiment, the towed vehicle attachment element 66 may be a tab with a locking aperture 68. The tab 66 is adapted to be positioned in one of the pair of the attachment points 18 of the towed vehicle 16 and locked in place with the locking pin 19B. While the tab is one embodiment of the towed vehicle attachment element 66, alternative constructions may also be utilized, and such alternatives should be considered within the scope of the present invention.

FIG. 6 is a sectional view of one of the pair of tow bars 50 in a collapsed configuration. FIG. 7 is a sectional view of one of the pair of tow bars 50 in an elongate, towing configuration. As illustrated in FIGS. 6-7, the tow bar apparatus 10 includes a locking element 70 that removably locks the first and second tow bar elements 56 and 58 in the elongate towing configuration, so that they do not collapse while in use. The locking element 70 is preferably fastened to the first tow bar element 56, and abuts the second two bar element 58 in a manner that enables the rotation of the first tow bar element 56 with respect to the second tow bar element 58 when the tow bar 10 is in the elongate towing configuration.

As illustrated in FIGS. 6-7, in one embodiment the locking element 70 may be a cam element 72 that is pivotally connected to the first tow bar element 56 with a cam pivot pin 76 such that a locking portion 74 of the cam element 72 is located within the first tow bar element 56 adjacent the second tow bar element 58. A spring 78 biases the cam element 72 toward a locking position, and a handle 80 extends from the cam element 72 for moving the cam element 72 to an unlocking position.

FIG. 6 illustrates the tow bar 50 in the collapsed configuration. When the tow bar 50 is moved to the extended towing configuration, as shown in FIG. 7, the locking portion 74 of the cam element 72 engages a cam engaging portion 82 of the tow bar, and the spring 78 holds the cam element 72 in place. The cam-engaging portion 82 may be annular and shaped to enable the locking portion 74 of the cam element 72 to rotate with respect to the cam engaging portion 82. The construction of the locking element 70 enables the first and second tow bar elements 56 and 58 to rotate with respect to each other without interference by or harm to the locking element 70. This rotation enables a further range of movement by the tow bars 50 with respect to the hitch member 20. When the tow bar apparatus 10 is subjected to a twisting motion or stress, this stress and/or movement may be accommodated without damage to the tow bar apparatus 10.

When the handle 80 is squeezed toward the tow bar 50, the bias of the spring 78 is overcome, the cam element 72 disengages from the cam engaging portion 82, and allows the tow bar 50 to be collapsed for storage.

The first and second tow bar elements 56 and 58, and/or the locations of the locking element 70, may be reversed, and such an obvious reversal of the explicitly disclosed embodiment is considered expressly within the scope of the claimed invention, and all terminology is hereby defined to include such a reversal of the present embodiment.

While one embodiment of the locking element 70 is disclosed herein, alternative embodiments are also included within the scope of this term. For example, a locking pin (not shown) might engage an annular groove (not shown) of the tow bar 50, thereby locking the tow bar 50 in a given configuration, but enabling rotation of the first and second tow bar elements 56 and 58. Those skilled in the art may devise any number of similar and/or equivalent embodiments, and such alternatives should be considered within the scope of the present invention.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tow bar apparatus for use by a towing vehicle for towing a towed vehicle over a surface, the towing vehicle having a hitch receiver, the tow bar apparatus comprising:
a hitch member having a receiver tube and a vertical pivot post, the receiver tube being adapted to removably engage the hitch receiver of the towing vehicle, and the vertical pivot post having a vertical axis that is generally orthogonal to the surface when the hitch member is mounted on the towing vehicle;
a pair of linkages that each include a vertical aperture and a horizontal pivot pin, the vertical aperture being adapted for pivotally mounting the linkage on the vertical pivot post of the hitch member such that the linkages are mounted in a stacked arrangement and such that the linkages may pivot about the vertical axis of the vertical pivot post;
a pair of tow bars, each having a proximal end and a distal end, the proximal end being adapted to be pivotally attached to one of the linkages with the horizontal pivot pin, the distal end having a towed vehicle attachment element adapted to be removably attached to the towed vehicle; and
a storage plate positioned on the vertical pivot post, the storage plate having a stored locking aperture positioned adjacent the proximal end of the tow bars such that a locking post of the proximal end may engage the stored locking aperture of the storage plate when the tow bar is in a stored position, thereby locking the tow bar in the stored position.

2. A tow bar apparatus for use by a towing vehicle for towing a towed vehicle over a surface, the towing vehicle having a hitch receiver, the tow bar apparatus comprising:
a hitch member having a receiver tube and a vertical pivot post, the receiver tube being adapted to removably engage the hitch receiver of the towing vehicle, and the vertical pivot post having a vertical axis that is generally orthogonal to the surface when the hitch member is mounted on the towing vehicle;
a pair of linkages that each include a vertical aperture and a horizontal pivot pin, each of the pair, of linkages being pivotally mounted on the vertical pivot post in a stacked arrangement, one on top of the other, and such that the linkages may pivot about the vertical axis of the vertical pivot post;
a pair of tow bars, each having a proximal end and a distal end, the proximal end being adapted to be pivotally attached to one of the linkages with the horizontal pivot pin, the distal end having a towed vehicle attachment element adapted to be removably attached to the towed vehicle; and
a storage plate adapted for locking the tow bar in the stored position, the storage plate being positioned on the vertical pivot post between the pair of linkages.

* * * * *